United States Patent Office 3,558,686
Patented Jan. 26, 1971

3,558,686
METHOD FOR PREPARING BORON TRI(THIOALKYL) COMPOUNDS BY REACTION OF BORON OXYHALIDES WITH ALKYLMERCAPTANS
David W. Young, Hammond, Ill., assignor to Sinclair Research, Inc., New York, N.Y., a corporation of Delaware
No Drawing. Original application Oct. 16, 1963, Ser. No. 316,504, now Patent No. 3,423,359, dated Jan. 21, 1969. Divided and this application July 26, 1967, Ser. No. 656,029
Int. Cl. C07f 5/04
U.S. Cl. 260—462
9 Claims

ABSTRACT OF THE DISCLOSURE

Boron thioalkyl compound, for example trimethyl thioborate, are prepared by reacting boron oxyhalides with alkylmercaptans at elevated temperatures. The alkylmercaptan contains from 1–20 carbon atoms. These boron thioalkyl compounds may be incorporated into synthetic polymers to provide compositions having improved antioxidant or thermal characteristics.

---

This application is a divisional of application Ser. No. 316,504, filed Oct. 16, 1963, now U.S. Patent 3,423,359 issued Jan. 21, 1969.

This invention is directed to an improved method for the preparation of boron thioalkyl compounds.

Several methods for the synthesis of boron thioalkyl compounds have been reported in the literature. It is known, for instance, that boron tri(thioalkyl) has been prepared by reacting boron trichloride with organic mercaptans. This method of preparation, however, has not been altogether satisfactory in that the yields of desired product obtained are relatively low, i.e. usually on the order of about 50%. Other preparation methods either suffer from the same yield disadvantages or are unattractive from an economic standpoint due to the laborious process involved, the expense of materials and equipment, excessive formation of undesirable by-products, etc.

I have now discovered a simple and convenient method for preparing boron thioalkyl compounds which can be represented generally by the following formula:

$$(RS)_3B$$

wherein S is sulfur and R is an alkyl radical of 1 to 20 carbon atoms, preferably 1 to 10 carbon atoms in a straight or branched chain. In accordance with the method of the present invention, the oxyhalide salt of boron is reacted at a temperature up to 250° C., preferably about 75 to 200° C., with an alkylmercaptan containing the number of carbon atoms that corresponds to R in the above formula. For best yields the mole ratio of the alkyl-mercaptan to boron oxyhalide employed in the reaction is at least sufficient to satisfy the valence of the boron with alkyl substituents from the alkylmercaptan reactant. Use of an excess of alkylmercaptan required to satisfy the valence of boron is preferred. The reaction is advantageously conducted in the presence of an inert liquid diluent as, for example, an alkane of 4 to 12 carbon atoms with refluxing of the reactants to insure complete reaction.

The boron oxyhalide reactant of the invention can be prepared by any method known to the art as, for example, the method disclosed in U.S. Patent 2,542,610. A preferred method comprising providing boron halide together with a stoichiometric amount of $MgSo_4 \cdot 7H_2O$ in a sealed glass tube and keeping the two materials apart by means of a suitable barrier in the glass tube. After about 40 hours the oxyhalide is obtained. Any of the oxyhalides that can be made are suitable reactants in the method of the present invention. The preferred halogens are F and Cl.

The following example is included to further illustrate the present invention.

EXAMPLE I 0.04 mole boron oxychloride (BOCl) was added directly to a solution of 0.145 mole of n-amyl mercaptan in 25 ml. of decane at 25° C. The resulting solution was refluxed at 100 to 180° C. for about 5 hours. The decane was removed and the reaction mixture was filtered. The filtrate was distilled to provide a 79% yield of $$(n\text{-}C_5H_{11}S)_3B$$

having a boiling point of 170 to 172° C. and a refractive index $n_D^{24}$ of 1.51. Analysis of the product showed the following:

| | |
|---|---:|
| Percent C in product | 55.35 |
| Percent H in product | 10.10 |
| Percent B in product | 3.45 |
| Percent S in product | 30.10 |
| M.W. (cryoscopic in benzene) | 312.5 |

The example shows that high yields of boron tri(thioalkyl) compounds are obtained by the method of the present invention.

EXAMPLE II 21 grams (about 0.44 mole) of pure methylmercaptan was added to about 0.13 mole of boron oxychloride in 200 ml. of dry pentane at −78° C. The temperature of the mixture was increased to −40° to −30° C. over a period of two hours. About 12.6 grams of liquid trimethylamine was added at 0° C. and the mixture agitated for four hours. Provision of the trimethylamine is for the purpose of removing any free chlorine. Insoluble trimethylamine hydrochloride was removed by filtration after standing for 15 hours. Distillation of the filtrate yielded propane and about 8.51 grams of trimethyl thioborate having a boiling point of 103° C. at 18 mm.

Boron thioalkyl compounds prepared by the method of the invention have utility in a number of applications, for example, as catalysts in the preparation of amides by the reaction of carboxylic acids with amines. It has now been found that incorporating small effective amounts of boron thioalkyl compounds into synthetic polymeric materials provides a composition having improved antioxidant or thermal stability characteristics.

The synthetic polymeric materials including homopolymers, copolymers and interpolymers to which the additives are incorporated are well-known resin polymers and have Staudinger molecular weights of at least 1,000 up to 300,000 or even 1,000,000 or more. They are obtained by a variety of polymerization procedures including, for example, emulsion polymerization of the styrenes, the conjugated butadiene hydrocarbons isoprene, dimethylbutadiene, ethylene, isobutene, chloroprene, etc., which may be polymerized with one another, or with other compounds containing a vinyl group, such as acrylonitrite, methyl acrylate, etc. The synthetic materials can be non-rubbery in nature, for instance, synthetic hydrocarbon polymers such as polyethylene, polypropylene, polystyrene, etc. or rubber-like, and often the polymers are hydrocarbons. Suitable rubber-like compositions which may be utilized in accordance with this invention thus include isobutylene-isoprene copolymers, butadiene-styrene copolymers, polybutadiene, butadiene-acrylonitrile copolymers, chloroprene polymers and isoprene polymers, all of which may be prepared under conditions well known in the art.

The boron thioalkyl additive of this invention can be added to the synthetic polymeric materials, which constitute the major amount of the composition of the invention, by simply mixing or blending at elevated temperature and is incorporated in amounts sufficient to significantly improve thermal stability or antioxidant properties of the synthetic polymeric materials. The actual amount incorporated in any given instance will vary depending on the particular polymeric material selected. In general, the additive of the invention is added in amounts of about .01 to 5%, preferably about 0.1 to 2% by weight based on the synthetic material.

In addition to the boron compound of the invention, the synthetic materials can contain numerous other components commonly blended and processed with the polymeric substances to obtain other desired characteristics such as high tensile strength, high elastic limit, high elongation and good flexure, etc. The various components commonly used include vulcanizing agents, accelerators, accelerator activators, anti-ozonants, reinforcing fillers, extending agents, pigment softeners, plasticizers, extruding agents, peptizers and miscellaneous materials for imparting special properties.

The following examples are included to illustrate the improved thermal stability and anti-oxidant properties of the present invention.

EXAMPLE III

Butyl rubber (a copolymer of 97 parts isobutylene and 3 parts isoprene) having a molecular weight of 37,000 was admixed with 0.25% $(n-C_5H_{11}S)_3B$. The butyl rubber was prepared in the laboratory to be sure that the rubber was free of commercial additives. The butyl rubber containing the $(n-C_5H_{11}S)_3B$ additive was placed in a dark air oven maintained at a temperature of 110° C. Another piece of the butyl rubber containing no additive was likewise placed in the oven. In a similar manner another butyl rubber sample containing 0.25% of 2,6-di-tertiary butyl-4-methyl phenol, (additive employed commercially as a heat stabilizer and antioxidant for butyl rubber) was also placed in the oven. Staudinger molecular weights were determined before or after the aging. The results are reported in the Table I below.

TABLE NO. 1

| Product | Percent additive | Time in oven, hours | Staudinger mol. wt. |
|---|---|---|---|
| Butyl rubber raw | 0.0 | 0 | 37,000 |
| | 0.0 | 62 | 21,000 |
| | 0.0 | 104 | 9,000 |
| +Tri n-amyl thioborate | 0.25 | 0 | 37,100 |
| | 0.25 | 62 | 35,000 |
| | 0.25 | 150 | 33,000 |
| +2,6-di-t-butyl-4-methyl phenol | 0.25 | 0 | 37,000 |
| | 0.25 | 62 | 34,000 |
| | 0.25 | 151 | 15,500 |

The data of the table demonstrate the advantageous thermal stability characteristics (as measured by the decrease in molecular weight) provided the rubber by the $(n-C_5H_{11}S)_3B$ additive of the invention.

EXAMPLE IV

The tri-n-amyl thioborate of Example I was tested for antioxidant effectiveness in rubbery polyisobutylene having an approximate Staudinger molecular weight of about 105,000. The results including control tests are given in Table II below. The blank or control polymer, as well as the test product, were all milled at 185 to 200° F. on a micro rubber mill for eight minutes and then placed in test. 0.25 weight percent of the tri-n-amyl thioborate additive was employed. The test comprised placing the test polymer in the form of small pieces on a watch glass and then passing the test sample into an oven maintained at 110° C. for a period of 30 days. At the end of this period, the loss in molecular weight was determined. For comparison, 0.25 weight percent of two commercial antioxidants (sulfur and phenyl-β-naphthylamine) were similarly tested. The results of the tests are shown in Table II. Comparison of the color and molecular weight loss of the products reveals that the tri-n-amyl thioborate additive provided the polyisobutylene with superior thermal stability characteristics over those demonstrated by the commercial antioxidants.

TABLE II

| | Properties of agent polymers | |
|---|---|---|
| Material tested as antioxidant | Color | Percent mol. wt. lost |
| None | Water white | 88 |
| Sulfur | do | 17 |
| Phenyl-beta-naphthylamine | Black | 5 |
| n-Amyl thioborate | Water white | 4 |

EXAMPLE V

The tri-n-amyl thioborate of Example I was tested for antioxidant effectiveness in polyethylene having a molecular weight of 20,000. The test employed was an oxidation absorption test which comprises subjecting the test sample to oxidation at a temperature of 140° C. and periodically measuring the oxygen up-take in ccs. per gram of polyethylene utilized. For comparison, a blank polymer and the polymer containing 0.125% of the tri-n-amyl thioborate were both tested. Results of the test are shown in Table III.

TABLE III.—OXYGEN UPTAKE IN CC. PER GRAM OF 20,000 MOLECULAR WEIGHT POLYETHYLENE

[Oxidation rate of a branched polyethylene at 140° C.]

| | Oxygen uptake in cc. per gram of polyethylene | |
|---|---|---|
| Time in hours | Blank polymer | Polymer+0.125% n-amyl thioborate |
| 10.0 | 8 | 7.5 |
| 25.0 | 84 | 87 |
| 50.0 | 155 | 123 |
| 75.0 | 243 | 145 |
| 100.0 | 318 | 152 |

The data of Table III show that for the first 25 hours of oxidation, the polyethylene containing the additive of the present invention oxidized as rapidly at 135 to 140° C. as the blank polymer. However, after longer periods of oxidation, for instance after 25 hours, the oxidation rate of the additive-containing polymer significantly decreases compared to that of the blank polymer.

It is claimed:

1. A method for the preparation of boron thioalkyl compounds having the general formula:

$$(RS)_3B$$

wherein R is an alkyl group of 1 to 20 carbon atoms, which consists essentially of reacting at a temperature up to about 250° C. an oxyhalide salt of boron with an alkyl mercaptan of 1 to 20 carbon atoms.

2. The method of claim 1 wherein the reaction temperature is about 75° to 200° C.

3. A method for the preparation of boron thioalkyl compounds having the general formula:

$$(RS)_3B$$

wherein R is an alkyl group of 1 to 10 carbon atoms which consists essentially of reacting at a temperature of about 75 to 200° C. boron oxychloride with an alkyl mercaptan of 1 to 10 carbon atoms.

4. A method for the preparation of boron thioalkyl compounds having the general formula:

$$(RS)_3B$$

wherein R is an alkyl group of 1 to 20 carbon atoms, which consists essentially of reacting at a temperature up to about 250° C. boron oxychloride with an alkyl mercaptan of 1 to 20 carbon atoms.

5. A method for the preparation of boron thioalkyl compounds as set forth in claim 4 wherein the alkyl mercaptan is n-amyl mercaptan and the resulting boron thioalkyl compound is tri(n-amylthio)borate.

6. A method for the preparation of boron thioalkyl compounds as set forth in claim 5 wherein the alkyl mercaptan is methylmercaptan and the resulting boron thioalkyl compound is tri(methylthio)borate.

7. A method for the preparation of boron thioalkyl compounds having the general formula:

$$(RS)_3B$$

wherein R is an alkyl group of 1 to 20 carbon atoms, which consists essentially of reacting at a temperature up to about 250° C., an alkyl mercaptan of 1 to 20 carbon atoms with an oxyhalide salt of boron where the halogen of the oxyhalide is selected from the group consisting of fluorine and chlorine.

8. A method for the preparation of boron thioalkyl compounds as set forth in claim 7 where R is an alkyl group of 1 to 10 carbon atoms and the alkyl mercaptan is of 1 to 10 carbon atoms.

9. A method for the preparation of boron thioalkyl compounds as set forth in claim 8 wherein the reaction temperature is about 75 to 200° C.

References Cited

UNITED STATES PATENTS

| 3,129,239 | 4/1964 | Lang | 260—462 |
| 2,970,428 | 2/1961 | Zletz | 60—35.4 |

LEON ZITVER, Primary Examiner

L. J. DECRESCENTE, Assistant Examiner

UNITED STATES PATENT OFFICE
CERTIFICATE OF CORRECTION

Patent No. 3,558,686                    Dated January 26, 1971

Inventor(s) David W. Young

It is certified that error appears in the above-identified patent and that said Letters Patent are hereby corrected as shown below:

Column 2, line 14, "79%" should be --78%--.

Column 2, line 41, "8.51" should be --8.52--.

Column 5, line 7, in claim 6, "5" should be --4--.

Signed and sealed this 15th day of June 1971.

(SEAL)
Attest:

EDWARD M. FLETCHER, JR.
Attesting Officer

WILLIAM E. SCHUYLER,
Commissioner of Paten